Aug. 7, 1923.
H. S. HEARN ET AL
1,463,997
DIRECTION SIGNAL FOR MOTOR VEHICLES
Filed July 12, 1921
2 Sheets-Sheet 1
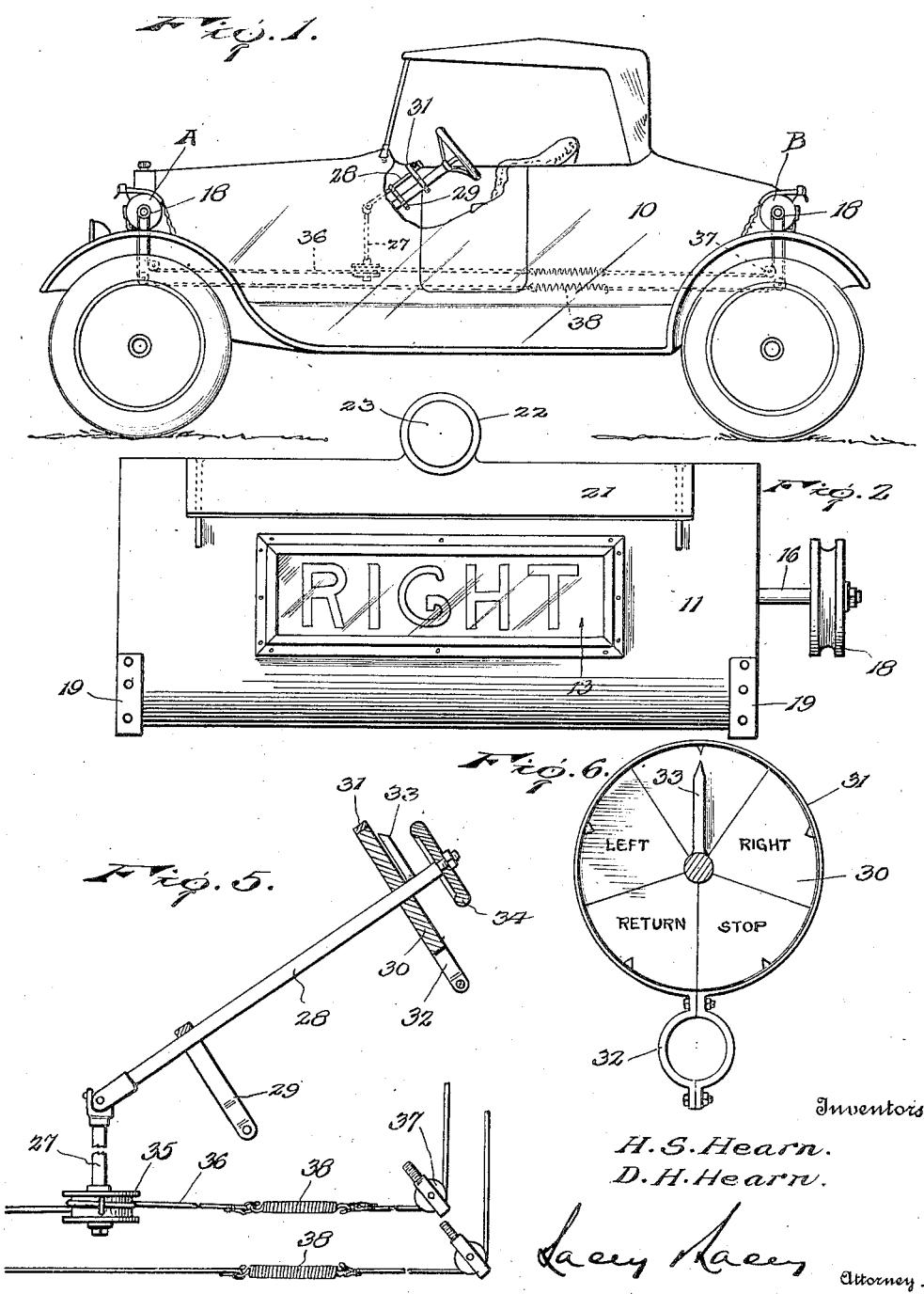

Aug. 7, 1923.　　　　　　　　　　　　　　　1,463,997
H. S. HEARN ET AL
DIRECTION SIGNAL FOR MOTOR VEHICLES
Filed July 12, 1921　　　　2 Sheets-Sheet 2
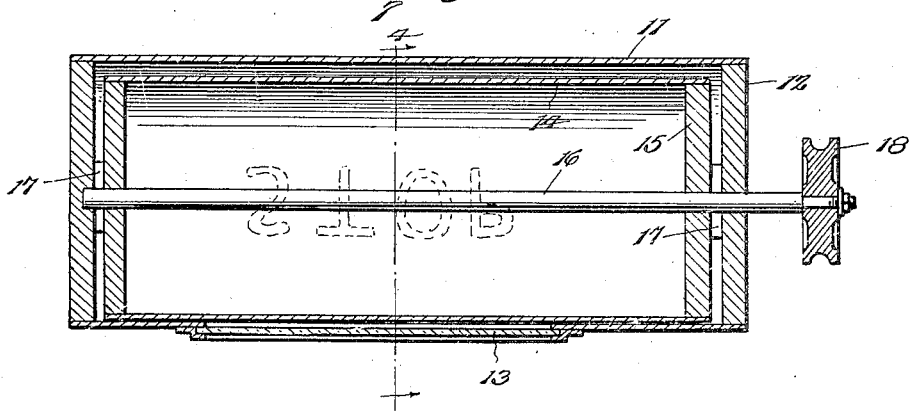
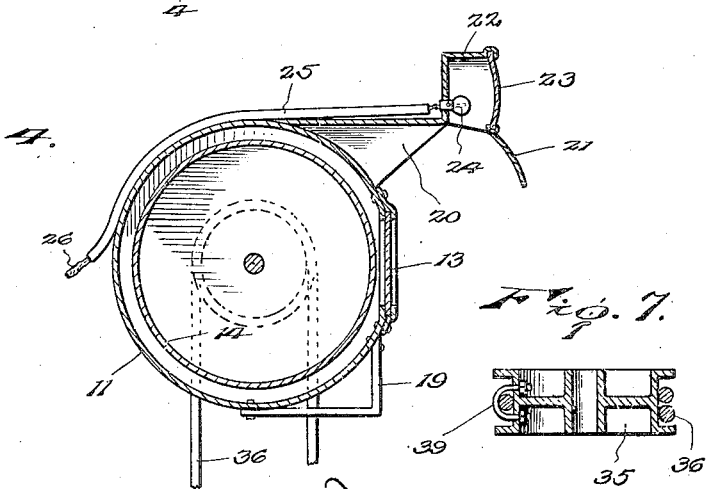
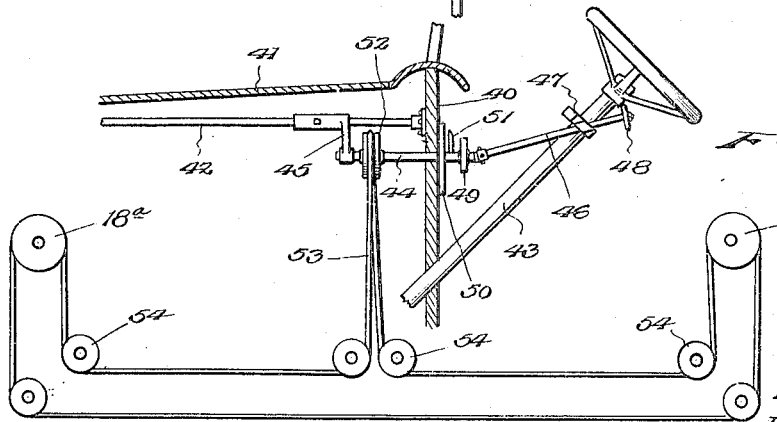
Inventors
H. S. Hearn.
D. H. Hearn.
By Lacey Lacey Attorneys Patented Aug. 7, 1923.

1,463,997

UNITED STATES PATENT OFFICE.

HIRAM S. HEARN AND DENMARK H. HEARN, OF DENVER, COLORADO.

DIRECTION SIGNAL FOR MOTOR VEHICLES.

Application filed July 12, 1921. Serial No. 484,148.

*To all whom it may concern:*

Be it known that we, HIRAM S. HEARN and DENMARK H. HEARN, citizens of the United States, residing at Denver, in the county of Denver and State of Colorado, have invented certain new and useful Improvements in Direction Signals for Motor Vehicles, of which the following is a specification.

This invention relates to an improved direction signal for motor vehicles and has as one of its principal objects to provide a practical and effective device of this character which will greatly minimize traffic accidents.

The invention has as a further object to provide an arrangement wherein a signal legend may be displayed both at the front and rear of a vehicle coincidently.

A further object of the invention is to provide a signal wherein a driver may readily indicate an intention to turn either to the right or left, to stop, or to turn completely around.

Another object of the invention is to provide a signal wherein the pair of signaling devices employed will also provide a means for supporting the license plates of the vehicle at the front and rear thereof and wherein the rear signaling device will further embody a tail light for the vehicle.

And the invention has as a further object to provide a signal which may be readily employed in connection with vehicles of substantially any conventional design.

Other and incidental objects will appear hereinafter.

In the drawings:

Figure 1 is a side elevation showing our improved signal in connection with a motor vehicle of conventional construction, Figure 2 is an elevation of the rear signaling device employed, Figure 3 is a horizontal sectional view through said signaling device, Figure 4 is a transverse section on the line 4—4 of Figure 3, looking in the direction of the arrows, Figure 5 is a fragmentary elevation partly in section showing the control mechanism employed, Figure 6 is a detail elevation of the dial used in conjunction with the control mechanism, Figure 7 is a detail section showing the manner in which the endless cable of the control mechanism is connected with the actuating pulley of said mechanism, and Figure 8 is a fragmentary section, partly in elevation, showing a modified form of control mechanism.

Referring now more particularly to the drawings, we have, for convenience, shown our improved signal in connection with a motor vehicle 10 of conventional design. In carrying the invention into effect, companion signaling devices, indicated as a whole by the reference characters A and B respectively, are employed, the signaling device A being arranged upon one front fender of the vehicle while the signaling device B is arranged upon one rear fender of the vehicle. These devices may, however, be mounted at any other suitable points at the front and rear of the vehicle.

The signaling devices A and B are substantially identical in construction and each includes a preferably cylindrical metal casing 11 closed at its ends by heads 12 which may be of wood. At its forward side, the casing is provided with a sight window 13. Revoluble in the casing is a signaling drum 14 which, like the casing, may also be formed of suitable sheet metal, and closing the drum at its ends are heads 15 which, like the heads 12, may be of wood. Extending through one of the heads 12 and through the heads 15 of the drum is a shaft 16 arranged axially of the casing and journaled in the other of the heads 12 of the casing. The drum is, of course, fixed upon this shaft to turn therewith and fitting through the shaft to coact with the drum heads 15 are pins 17 tightly securing the drum against longitudinal movement upon said shaft. At its outer end, the shaft carries a pulley 18. Suitably imposed upon the drum at appropriate points spaced circumferentially thereof are the signaling legends Right, Left, Stop and Return, respectively, which, by rotation of the drum, may be selectively brought into position opposite the sight window 13. Angle brackets 19 are secured to the casing 11 near the ends thereof, said brackets being arranged at the lower side of the casing and providing not only a means whereby the casing may be secured to the vehicle by suitable fastening devices extending through the brackets, but also providing a means for supporting a license plate which may be bolted or otherwise secured to the vertical portions of the brackets.

Extending horizontally from the casing at its upper side over the sight window 13, is a hood 20 which may also be formed of sheet metal and this hood is bent downwardly at its free end margin to provide a transversely curved or arcuate reflector 21 disposed in juxtaposition to said sight window. Medially of the hood at its junction with the reflector 21 is formed a lamp casing 22 which carries a lens 23, the casing being open at its lower side. The lens of the lamp of the signaling device B is preferably tinted red so that the lamp of this signaling device will provide a tail light in the rear of the vehicle. Mounted in the back wall of the casing 22 is a lamp socket in which is removably fitted an electric lamp 24 and secured to the casing 11 to extend upwardly thereover toward the lamp casing is a conduit 25 in which are arranged circuit wires 26 leading to the lamp. Current may be supplied from the battery of the vehicle or other approved source of electrical energy thereon and, as will be seen, when the lamp is energized, the reflector 21 will direct the light rays emanating from the lamp downwardly against the sight window 13 to illuminate any signaling legend displayed by the signaling drum at said window.

In conjunction with the signaling devices A and B, we employ a control mechanism therefor. This control mechanism includes, as particularly shown in Figure 5, a control shaft 27 to which is connected, by a suitable universal joint, a rearwardly inclined control rod 28. Supporting this rod adjacent the steering post is a bracket 29 engaged with the post and associated with the rod near its upper end is a dial 30. Surrounding the dial is a split clamping band 31 extended to form a split collar 32 engaging around the post for supporting the upper end portion of the rod with respect to the post. As shown in Figure 6, the dial is preferably laid off in segments, one of which is blank while the remaining segments carry the words Right, Left, Stop and Return, respectively. Projecting from the rod 28 to cooperate with the dial is a pointer 33 and mounted upon the upper end of the rod is a hand wheel 34. Mounted upon the lower end of the shaft 27 is a pulley 35 around which is wrapped an endless cable 36. This cable is trained around appropriately located pulleys 37 and, as shown in Figure 1, is engaged with the pulleys 18 of the signaling devices A and B. Interposed in the length of the cable are tensioning springs 38 and securing the cable to the pulley 37 is, as shown in detail in Figure 7, a U-bolt 39.

As will now be readily understood in view of the preceding description, by rotating the hand wheel 34 the signaling drums of the signaling devices A and B may be simultaneously rotated to display like signaling legends at the front and rear of the vehicle. The dial 30 and pointer 33 provide, of course, means whereby the driver of the vehicle may properly set the drums to display the signaling legends as desired. In the position of the pointer shown in Figure 6, no signaling legend will be displayed. When the pointer is moved to position over the segment labeled Right, the signaling drums will display a like signaling legend. Similarly, when the pointer is moved to overlie any one of the segments labeled Stop, Left and Return, a like signaling legend will, in each instance, be displayed by the drums. The signaling legend Return is provided to indicate an intention of the driver to turn completely around.

In Figure 8 of the drawings, we have illustrated a slightly modified control mechanism. In this figure the hood of the vehicle is indicated at 40, the usual brace rod under the engine at 41, and the steering post of the vehicle at 43. The signaling drum pulleys of the signaling devices are indicated at 18$^a$. Journaled through the dash 40 is a control shaft 44 supported at its forward end by a bracket 45 depending from the rod 42 and connected to said shaft by a suitable universal joint is a control rod 46 journaled through a suitable bracket 47 upon the steering post 43. At its rear end, this rod carries a hand wheel 48 and preferably, a similar wheel 49 is arranged upon the rear end portion of the shaft 44. Secured to the dash is a dial 50 corresponding to the dial 30 of the preferred construction, and extending from the shaft is a pointer 51 corresponding to the pointer 33. Fixed to the forward end portion of the shaft is a pulley 52 with which is connected a cable 53. This cable is trained around appropriately located pulleys 54 and is engaged with the pulleys 18$^a$. Thus, as will be seen, the rod 46 may be turned for rotating the pulleys 18$^a$ and operating the signaling devices.

Having thus described the invention, what is claimed as new is:

1. In a direction signal for motor vehicles, the combination of a signaling device, a cable actuating said device, a control shaft having a pulley thereon engaged with the cable, a rotatable hand operated control rod extending in angular relation to the shaft, and a universal joint connecting said control rod with said shaft whereby the rod may be turned for driving said cable.

2. The combination with a motor vehicle having a steering post, of a signaling device, a cable actuating said device, a control shaft having a pulley thereon engaged with the cable, a hand operated control rod extending upwardly along the steering post adjacent thereto, a universal joint connecting said rod with the shaft, a dial journaling the rod, and a clamping band surrounding the dial and engaged with the post supporting the dial and rod with respect to the post.

3. In a direction signal for motor vehicles, a cylindrical casing having a longitudinally extending sight window, a signaling drum rotatable within the casing and visible through said window, a tangentially disposed hood extending rearwardly from the upper side of the casing to overhang said sight window and provided with end walls engaging the casing to support the hood with respect thereto, the hood having a free outer margin directed downwardly to form a reflector extending in juxtaposition to said sight opening, a medially disposed lamp casing upstanding from the hood at the inner edge of said reflector, the lamp casing being open at its lower side beneath the hood and at its rear end above the reflector, and a transparency closing the rear end of said lamp casing.

In testimony whereof we affix our signatures.

HIRAM S. HEARN. [L. S.]
DENMARK H. HEARN. [L. S.]